(12) United States Patent
Khoshnevis et al.

(10) Patent No.: US 7,986,673 B2
(45) Date of Patent: Jul. 26, 2011

(54) SYSTEMS AND METHODS FOR REDUCING FEEDBACK OVERHEAD IN WIRELESS NETWORKS USING CHANNEL CHARACTERISTICS

(75) Inventors: Ahmad Khoshnevis, Portland, OR (US); Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 247 days.

(21) Appl. No.: 12/130,532

(22) Filed: May 30, 2008

(65) Prior Publication Data

US 2009/0296595 A1 Dec. 3, 2009

(51) Int. Cl.
*H04J 3/00* (2006.01)
(52) U.S. Cl. .................. 370/332; 370/252; 375/345
(58) Field of Classification Search .............. 370/252, 370/241, 332; 455/450; 375/345
See application file for complete search history.

(56) References Cited

U.S. PATENT DOCUMENTS

| | | | |
|---|---|---|---|
| 7,499,709 B2 * | 3/2009 | Das et al. .................... 455/455 |
| 7,649,831 B2 * | 1/2010 | Van Rensburg et al. ...... 370/203 |
| 7,773,557 B2 * | 8/2010 | Grant et al. .................. 370/328 |
| 2006/0034398 A1 * | 2/2006 | Reznik et al. ................ 375/340 |
| 2006/0034401 A1 * | 2/2006 | Cho et al. .................... 375/345 |
| 2006/0285515 A1 * | 12/2006 | Julian et al. ................. 370/328 |
| 2007/0293230 A1 | 12/2007 | Lee |
| 2007/0293233 A1 * | 12/2007 | Inoue et al. ................... 455/450 |
| 2008/0064386 A1 * | 3/2008 | Nibe ......................... 455/422.1 |
| 2009/0052381 A1 * | 2/2009 | Gorokhov et al. ........... 370/329 |

FOREIGN PATENT DOCUMENTS

| | | |
|---|---|---|
| CN | 101090552 | 12/2007 |
| EP | 1 868 397 | 12/2007 |
| JP | 2007-336176 | 12/2007 |
| KR | 10-2007-0119499 | 12/2007 |
| WO | 2008020790 | 2/2008 |
| WO | 2008/053553 | 5/2008 |

OTHER PUBLICATIONS

S. Jeon, D. Cho, "An Enhanced Channel-Quality Indication (CQI) Reporting Scheme for HSDPA Systems," IEEE Communications Letters, vol. 9, No. 5, May 2005, pp. 432-434.
S. Jeon, D. Cho, "Channel Adaptive CQI Reporting Schemes for HSDPA Systems," IEEE Communications Letters, Vo. 10, No. 6, Jun. 2006, pp. 459-461.
3GPP TS 36.300 V8.3.0, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Dec. 2007.
3GPP TS 36.213 V8.1.0, "Technical Specification Group Radio Access Network; Evolved Universal Terrestrial Radio Access (E-UTRA); Physical layer procedures (Release 8)," Nov. 2007.

(Continued)

*Primary Examiner* — Phuc Tran
(74) *Attorney, Agent, or Firm* — Austin Rapp & Hardman (57) ABSTRACT

A method for reducing feedback overhead in a wireless communications system is described. Channel quality indicator (CQI) values corresponding to a measured channel quality are received from one or more mobile communications devices. The mobile communications devices to be scheduled at a future time are estimated. CQI values are requested from the mobile communications devices that are estimated to be scheduled at a future time.

30 Claims, 10 Drawing Sheets

OTHER PUBLICATIONS

T. Eriksson, T. Ottosson, "Compression of Feedback in Adaptive OFDM-Based Systems using Scheduling," IEEE Communications Letters, vol. 11, No. 11, Nov. 2007, pp. 859-861.

T. Eriksson, T. Ottosson, "Compression of Feedback for Adaptive Transmission and Scheduling," in Proceedings of the IEEE, vol. 95, No. 12, Dec. 2007, pp. 2314-2321.

M. Andrews, "A Survey of Scheduling Theory in Wireless Data Networks," in Proceedings of the 2005 IMA Summer Workshop on Wireless Communications.

R1-073945, Sharp, "Adaptive Best-M Based Scheme for CQI Reporting in the LTE UL," Oct. 2007.

International Search Report issued for International Patent Application No. PCT/JP2009/060207 on Aug. 18, 2009.

* cited by examiner

SYSTEMS AND METHODS FOR REDUCING FEEDBACK OVERHEAD IN WIRELESS NETWORKS USING CHANNEL CHARACTERISTICS

TECHNICAL FIELD

The present disclosure relates generally to communications and wireless communications systems. More specifically, the present disclosure relates to systems and methods for reducing feedback overhead in wireless networks using channel characteristics.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). In 3GPP LTE (E-UTRA and E-UTRAN) terminology, a base station is called an "evolved NodeB" (eNB) and a mobile terminal or device is called a "user equipment" (UE).

In 3GPP LTE, the eNB regularly transmits a downlink reference symbol (DLRS) that is used by the UEs for channel measurement, such as signal-to-interference ratio (SINR), which may be represented by a channel quality indicator (CQI). Each UE regularly transmits CQIs back to the eNB to enable the eNB to perform resource scheduling. Resource scheduling means the eNB allocates the modulation schemes, coding rates and subcarrier frequencies to optimize the downlink and uplink transmissions for each UE.

Frequency selective scheduling may significantly improve the system performance of broadband multi-carrier wireless networks such as 3GPP-LTE. The cost of frequency selective scheduling is uplink signaling overhead, as frequency selective CQI reports are needed at the base station. Therefore, improvements in wireless networks can be obtained by reducing the communication overhead without causing degradation in the system performance.

DETAILED DESCRIPTION

A method for reducing feedback overhead in a wireless communications system is described. Channel quality indicator (CQI) values corresponding to a measured channel quality are received from one or more mobile communications devices. The mobile communications devices to be scheduled at a future time are estimated. CQI values are requested from the mobile communications devices that are estimated to be scheduled at a future time.

In one configuration, a scheduling table may be generated that includes the mobile communications devices that are estimated to be scheduled at a future time. All of the mobile communications devices may be placed into a set K. The mobile communications devices estimated to be scheduled at a future time may be placed into a subset K1, wherein K1 is less than or equal to K.

Requesting CQI values from the mobile communications devices may include requesting more accurate channel information. In one aspect of the method, coarse channel information may be requested from mobile communications devices that are not estimated to be scheduled at a future time.

In one configuration, estimating may include using a temporal correlation of one or more parameters to place certain mobile communications devices into a subset K1. Furthermore, estimating may also include using a channel property by a scheduler to place certain mobile communications devices into a subset K1. The scheduler may estimate a future channel matrix. In addition, the scheduler may further estimate higher layer parameters.

The CQI values from the mobile communications devices that are estimated to be scheduled at a future time may be received over a feedback channel. In one configuration, only CQI values from the mobile communications devices that are estimated to be scheduled at a future time may be received over the feedback channel.

A base station configured to allocate resources to a communications device is also described. The base station includes a receiver configured to receive requested channel quality indicator (CQI) values corresponding to a measured channel quality from one or more mobile communications devices. A scheduler is configured to estimate the mobile communications devices to be scheduled at a future time. A transmitter is configured to request CQI values from one or more mobile communications devices.

A computer-readable medium comprising executable instructions is also described. Channel quality indicator (CQI) values corresponding to a measured channel quality are received from one or more mobile communications devices. The mobile communications devices to be scheduled at a future time are estimated. CQI values are requested from the mobile communications devices that are estimated to be scheduled at a future time.

A base station configured to allocate resources to a communications device is also described. The base station includes means for receiving requested channel quality indicator (CQI) values corresponding to a measured channel quality from one or more mobile communications devices. The base station also includes means for estimating the mobile communications devices to be scheduled at a future time.

Figure 1:
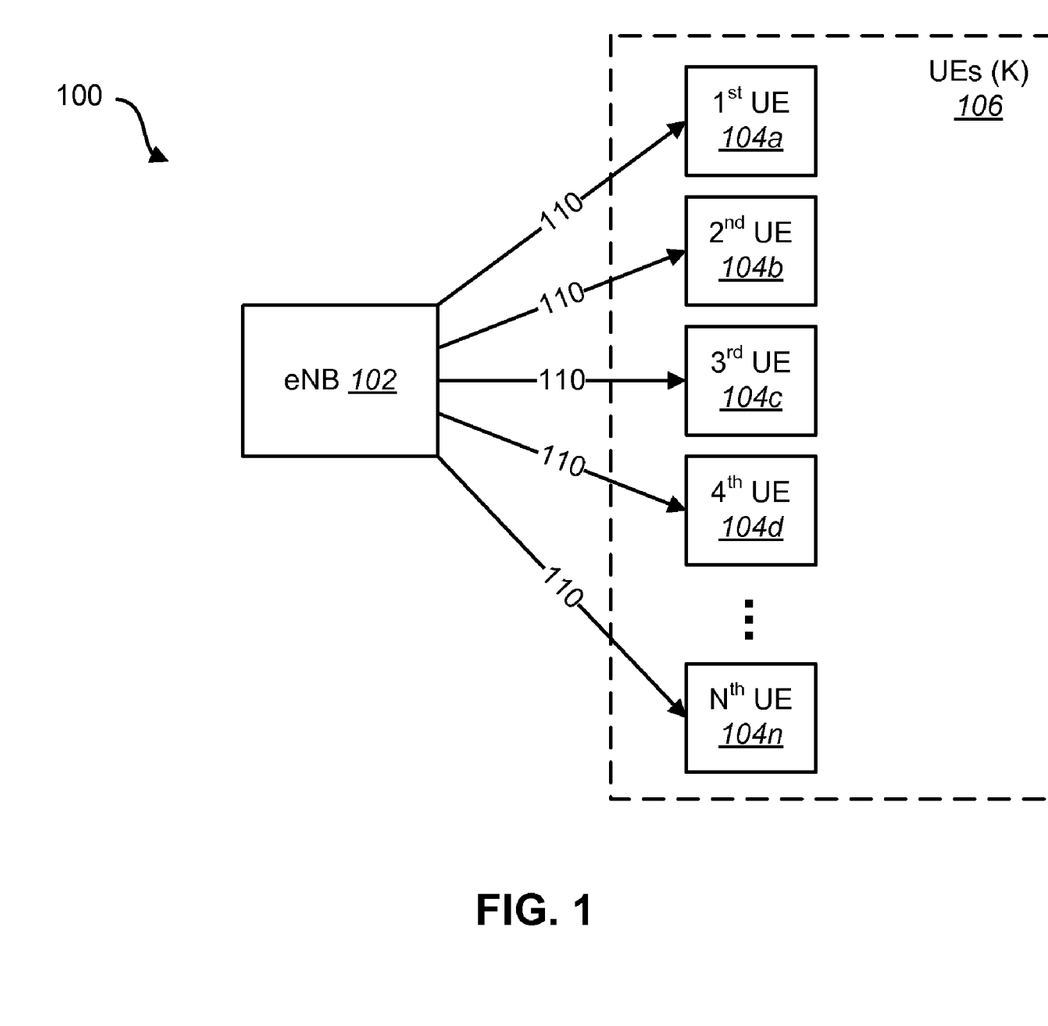
FIG. 1 illustrates a wireless communication system in which the present systems and methods may be practiced.

FIG. 1 illustrates a wireless communication system 100 in which the present systems and methods may be practiced. In a communications system 100, measurement reports may be sent from a mobile device to a base station. Measurement reports may indicate the quality of the environment of the communication system. Communications from the mobile device to the base station may be referred to as uplink communications. Similarly, communications from the base station to the mobile device may be referred to as downlink communications.

One important function of a base station may be scheduling uplink and downlink users. The base station may determine which users are going to be served and the resources that will be allocated to each user. The efficiency of the wireless communications system 100 may be increased if the base station makes this determination using parameters that are related to the performance of the communications system 100.

The base station may be referred to as an evolved NodeB (eNB). The mobile station may be referred to as user equipment (UE). The base station may be configured to allocate resources to a communications device. The base station may include a resource block location controller (see FIG. 7) configured to send frequency location information for at least one resource block to the communications device.

An eNB 102 may be in wireless communication with one or more pieces of mobile user equipment (UE) 104 (which may also be referred to as mobile stations, user devices, communications devices, subscriber units, access terminals, terminals, etc.). The eNB 102 may be a unit adapted to transmit to and receive data from cells.

In one example, the eNB 102 handles the actual communication across a radio interface, covering a specific geographical area, also referred to as a cell. Depending on sectoring, one or more cells may be served by the eNB 102, and accordingly the eNB 102 may support one or more mobile UEs 104 depending on where the UEs are located. In one configuration, the eNB 102 provides a Long Term Evolution (LTE) air interface and performs radio resource management for the communication system 100.

Data may be allocated to the UEs 104 in terms of resource blocks (RB). Resource blocks are used to describe the mapping of certain physical channels to resource elements. A resource block may be defined as a certain number of consecutive orthogonal frequency division multiplexing (OFDM) symbols in the time domain and a certain number of consecutive subcarriers in the frequency domain.

A first UE 104a, a second UE 104b, a third UE 104c, a fourth UE 104d and an Nth UE 104n are shown in FIG. 1. The eNB 102 may transmit data to the UEs 104 over a radio frequency (RF) communication channel 110. The transmitted data may include a plurality of LTE frames. In one configuration, the group of all UEs 104 may be referred to as the set K 106. The eNB 102 may transmit data to all the UEs 104 in set K 106. Alternatively, the eNB 102 may only transmit data to a subset of UEs 104 (see FIG. 3).

The data transmitted may be data requested by the particular UE 104 such as downloaded internet data. For example, the UEs 104 that are scheduled to be served by the eNB 102 may be served by the eNB 102 by receiving the data that the UE 104 has requested from the eNB 102. Alternatively, the data transmitted by the eNB 102 may include data for maintaining the wireless communication system 100. For example, the eNB 102 may transmit reference signals to the UEs 104 requesting channel estimation. Examples of possible reference signals include pilots or beacons which may be single tone signals with a known amplitude and frequency. Another example may be a reference signal used in current LTE systems, which is a known (by transmitter and receiver) sequence of symbols used for estimating the channel. A further example of a reference signal may be Zadoff-Chu sequences as described in 3GPP TS 36.211 V8.2.0 (2008-03). A scheduler on the base station may determine the service parameters, such as the coding and modulation scheme of a UE 104 before it is served. The scheduler may assign one or more UEs to each communication channel or RB. To perform this task, the base station may need channel quality information of all the UEs over the whole or a portion of the frequency band.

The present systems and methods may be independent of the algorithm used in the scheduler. In other words, the present systems and methods may provide benefits without knowledge of the scheduler implementation. For example, the present systems and methods may access the output of the scheduler without knowledge of the scheduler implementation.

Figure 2:
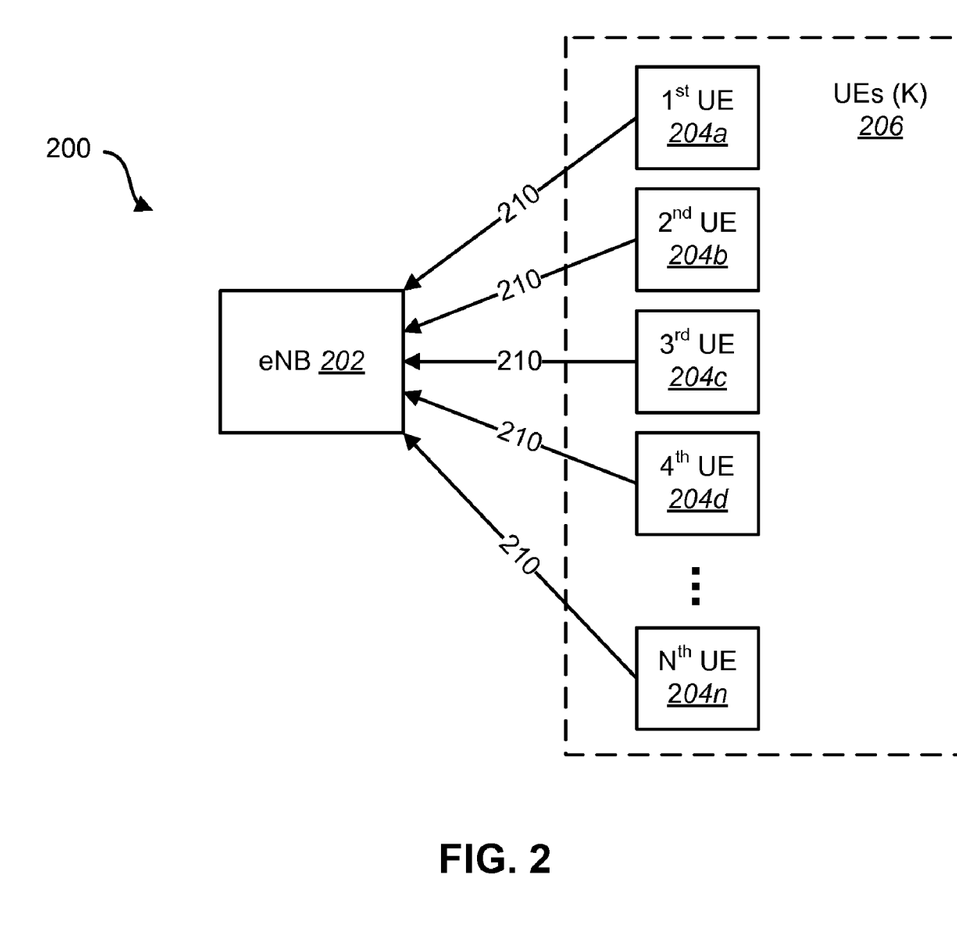
FIG. 2 illustrates the wireless communication system showing feedback.

FIG. 2 illustrates a wireless communication system 200 showing feedback. The UEs 204 in set K 206 may be in electronic communication with the eNB 202. The UEs 204 may generate measurement reports. In one example, the reports may include measurements of the UE's 204 radio environment. Measurement reports may indicate the quality of a channel used for communications on the uplink or downlink. A measurement report may be sent as a channel quality indicator (CQI) to the eNB 202. The eNB 202 may use the report (which indicates channel state information) for scheduling and link adaptation.

For example, the UEs 204 in set K 206 may report CQI values to the eNB 202. A CQI value may include information concerning one resource block. Alternatively, a CQI value may include information concerning multiple resource blocks. The CQI values may be transmitted to the eNB 202 using a feedback channel 210. In one configuration, all of the UEs 204 that are in electronic communication with the eNB 202 may transmit CQI values to the eNB 202. Each UE 204 may transmit only a single CQI value to the eNB 202 corresponding to a single RB. In an alternate configuration, each UE 204 may transmit multiple CQI values corresponding to multiple RBs to the eNB 202.

The purpose of communication is to convey a message from the sender (source, transmitter) to the destination (sink, receiver). In general we may refer to this message as data (useful information). Any other information being sent in any direction (transmitter to receiver (forward channel) or receiver to transmitter (reverse channel) may be considered as overhead, non-data communication or waste, because it takes resources (time, frequency, battery, etc.) away from the transmission of data. As a result, it is of interest to reduce the amount of non-data communication, which is one benefit, among others, of the present systems and methods. The information sent in a feedback channel typically includes non-data communications and is typically generated by MAC and higher layers. The transmissions for the feedback channel take resources from the Physical channel and are used by the receiver (in this example system by the UE) to transmit channel quality information (CQI), which is non-data communication, back to the transmitter (eNB).

Figure 3:
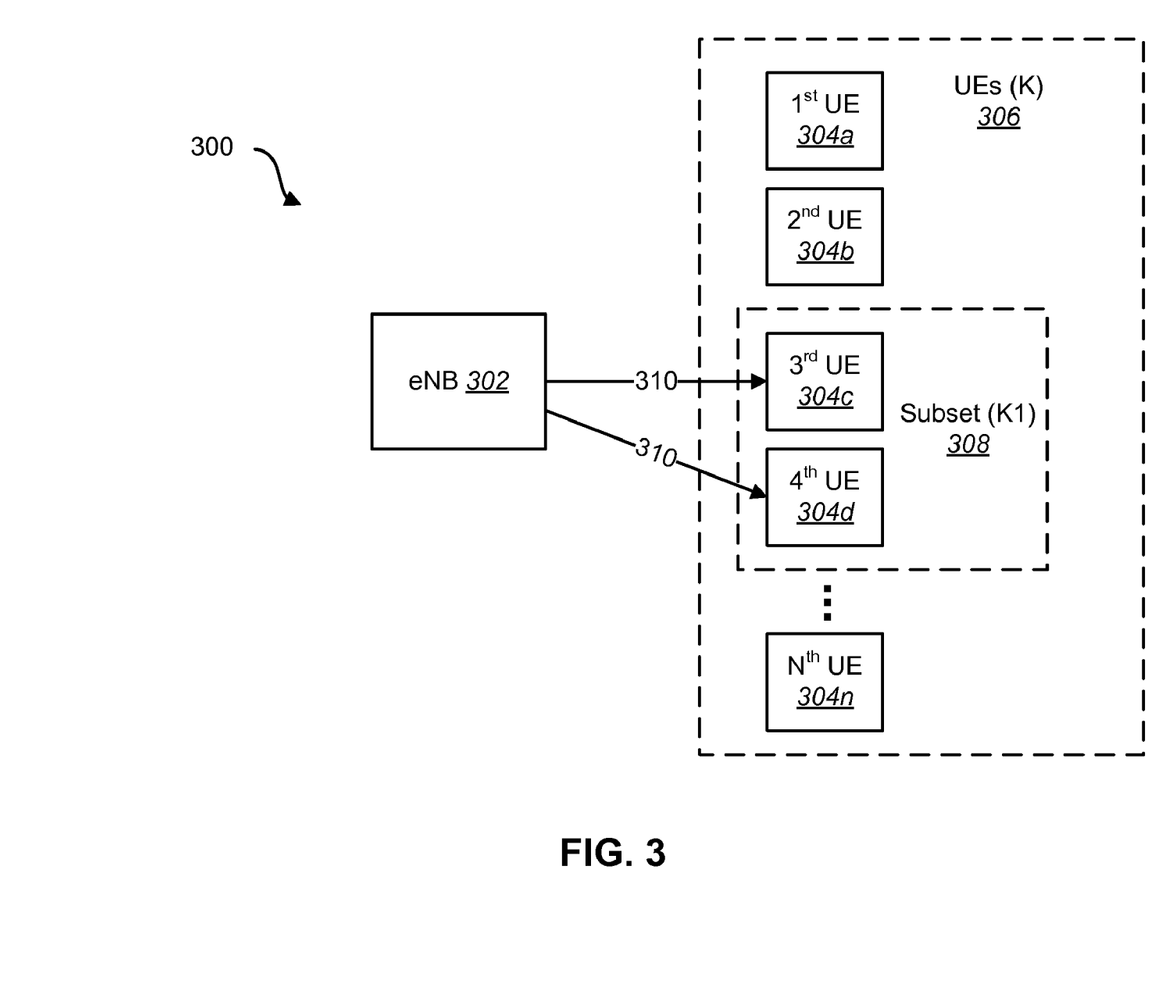
FIG. 3 illustrates the wireless communication system with a subset of UEs.

FIG. 3 illustrates a wireless communication system 300 with a subset 308 of UEs 304. As stated above, the eNB 302 may transmit 310 data to less than all of the UEs 304 in set K 306. For example, the eNB 302 may only transmit data to a subset K1 308 of UEs 304. The subset K1 308 may include one or more of the UEs 304 that are part of the set K 306 of UEs 304. The UEs 304 in subset K1 308 may be selected by the eNB 302.

In one configuration, the subset K1 308 may include UEs 304 that are currently scheduled to be served by the eNB 302. Alternatively, the subset K1 308 may include UEs 304 that have been previously scheduled to be served by the eNB 302. Alternatively still, the subset K1 308 may include UEs 304 that are scheduled to be served by the eNB 302 in the future. In yet another configuration, the subset K1 308 may include UEs 304 that the eNB 302 has estimated are likely to be scheduled in the future. The subset K1 308 of UEs 304 in the wireless communications system 300 of FIG. 3 includes two UEs: 304c and 304d.

The eNB 302 may transmit 310 data to the UEs 304 in subset K1 308 that is different than the data transmitted to all the UEs 304 in set K 306. For example, the eNB 302 may transmit 310 requests for information to the UEs 304 in subset K1 308 that are not sent to all of the UEs 304 in the set K 306.

Figure 4:
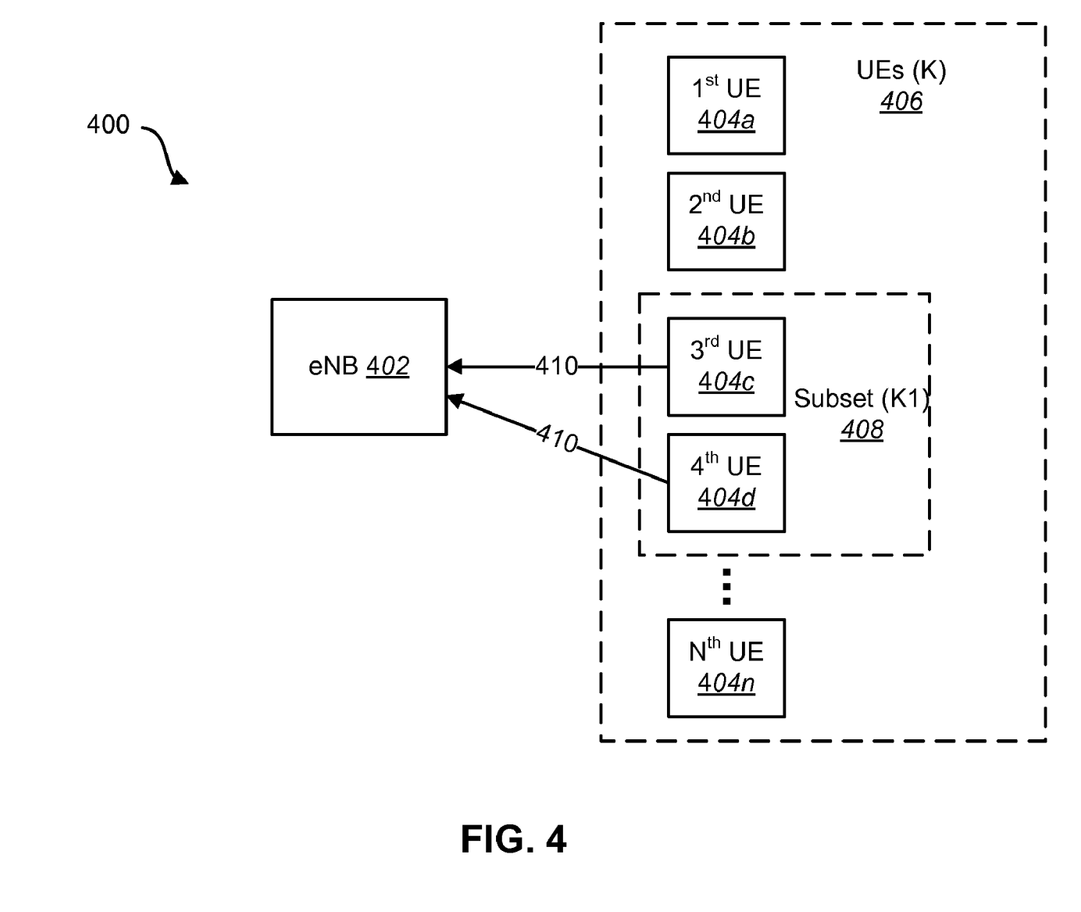
FIG. 4 illustrates the wireless communication system with the subset of UEs sending feedback.

FIG. 4 illustrates a wireless communication system 400 with the subset K1 408 of UEs 404 sending feedback to the eNB 402. The UEs 404 in subset K1 408 may be a subset of the total UEs 404 in set K 406. The UEs 404 in subset K1 408 may transmit data to the eNB 402. The UEs 404 in subset K1 408 may transmit CQI values to the eNB 402 using a feedback channel 410.

Figure 5:
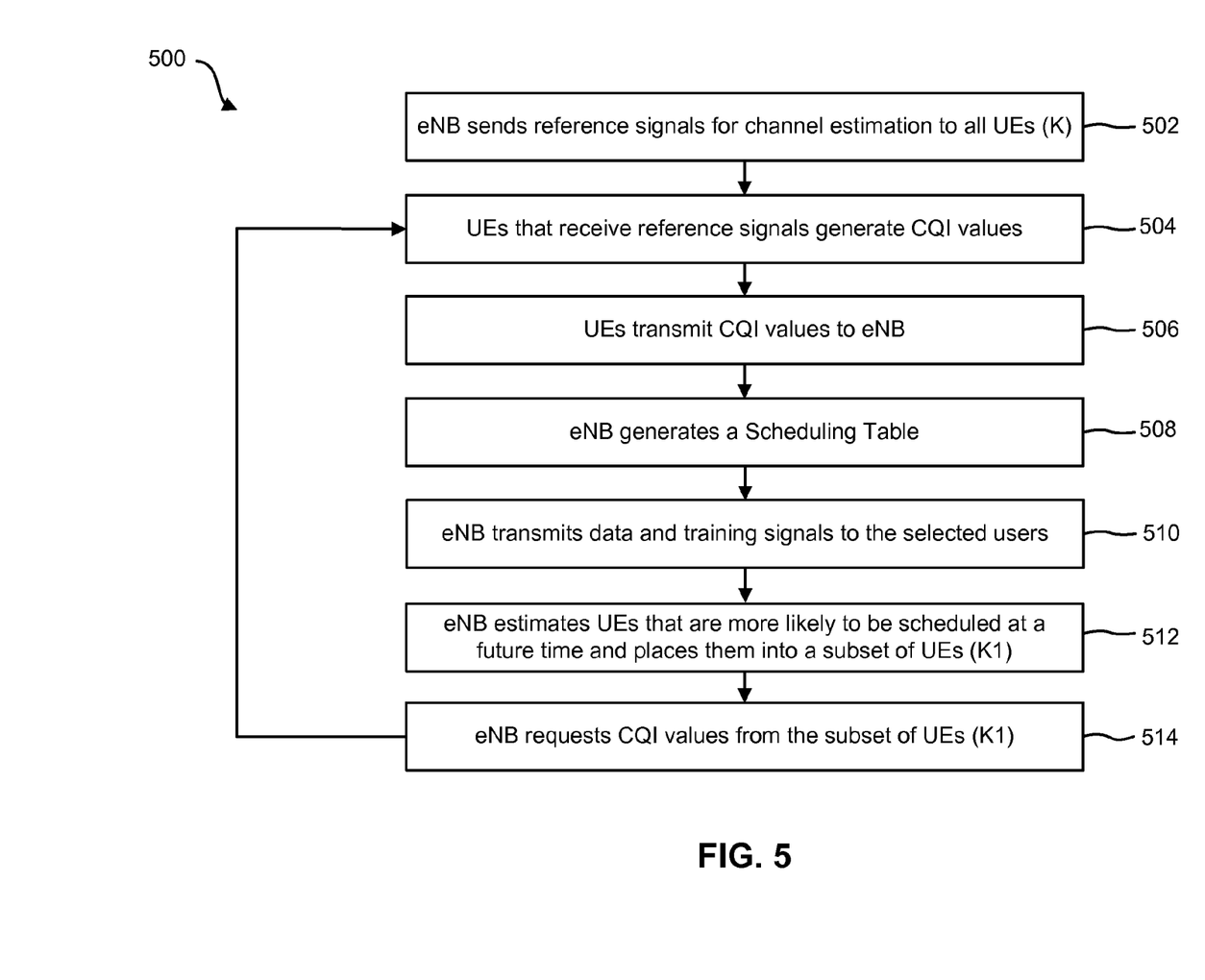
FIG. 5 is a flow diagram of a method for using channel characteristics to select a subset of users to access the feedback channel.

FIG. 5 is a flow diagram of a method 500 for using channel characteristics to select a subset of users to access a feedback channel. The eNB 402 sends 502 reference signals for channel estimation to all the UEs 504 in the set K 406. The UEs 404 that receive reference signals from the eNB 402 generate 504 CQI values. The UEs 404 that have generated CQI values then transmit 506 these CQI values to the eNB 402 using the feedback channel 410.

The eNB 402 receives the CQI values. The eNB 402 then generates 508 a scheduling table. The scheduling table may include a listing of all the UEs 404 that are currently scheduled to be served by the eNB 402. The scheduling table may also include information about UEs 404 that have been previously scheduled to be served by the eNB 402. The eNB 402 transmits 510 data and training signals to the selected UEs 404 in the scheduling table. Examples of data include, but are not limited to, voice, file transfer, web browsing, online investment, online gaming, multimedia, information generated by the application, etc. Training signals are the same as reference signals and are transmitted by the sender (eNB in this case) and are used by the receiver (UE) to estimate the channel. This estimation is used by the UE to receive the transmitted data by the eNB. The estimated channel is also sent back to the eNB (through the feedback channel, in the form of CQI, for example), which is used by the eNB to adjust transmission parameters such as power or rate to the channel conditions.

The eNB 402 may estimate 512 the UEs 404 in the set K 406 that are more likely to be scheduled at a future time. For example, the eNB 402 may use upper layer parameters such as Quality of Service (QoS), algorithm/module parameters, physical parameters such as CQI values for all the UEs 404, data source parameters, etc., to estimate what the parameter values will be at a future time. The eNB 402 may place the estimated UEs 404 into K1 408, a subset of UEs 404. The eNB 402 may then request 514 CQI values from the UEs 404 in subset K1 408. The process may then repeat as the UEs 504 that receive a request for CQI values generate the CQI values and transmit them to the eNB 402 via the feedback channel 410.

The number of UEs 404 in subset K1 408 will always be less than or equal to the number of UEs 404 in set K 406. Thus, in the worst case scenario, the number of UEs 404 in the subset K1 406 that are using the feedback channel 410 will be equal to the number of UEs 404 in set K 406 and the system 400 will not be adversely affected.

Figure 6:
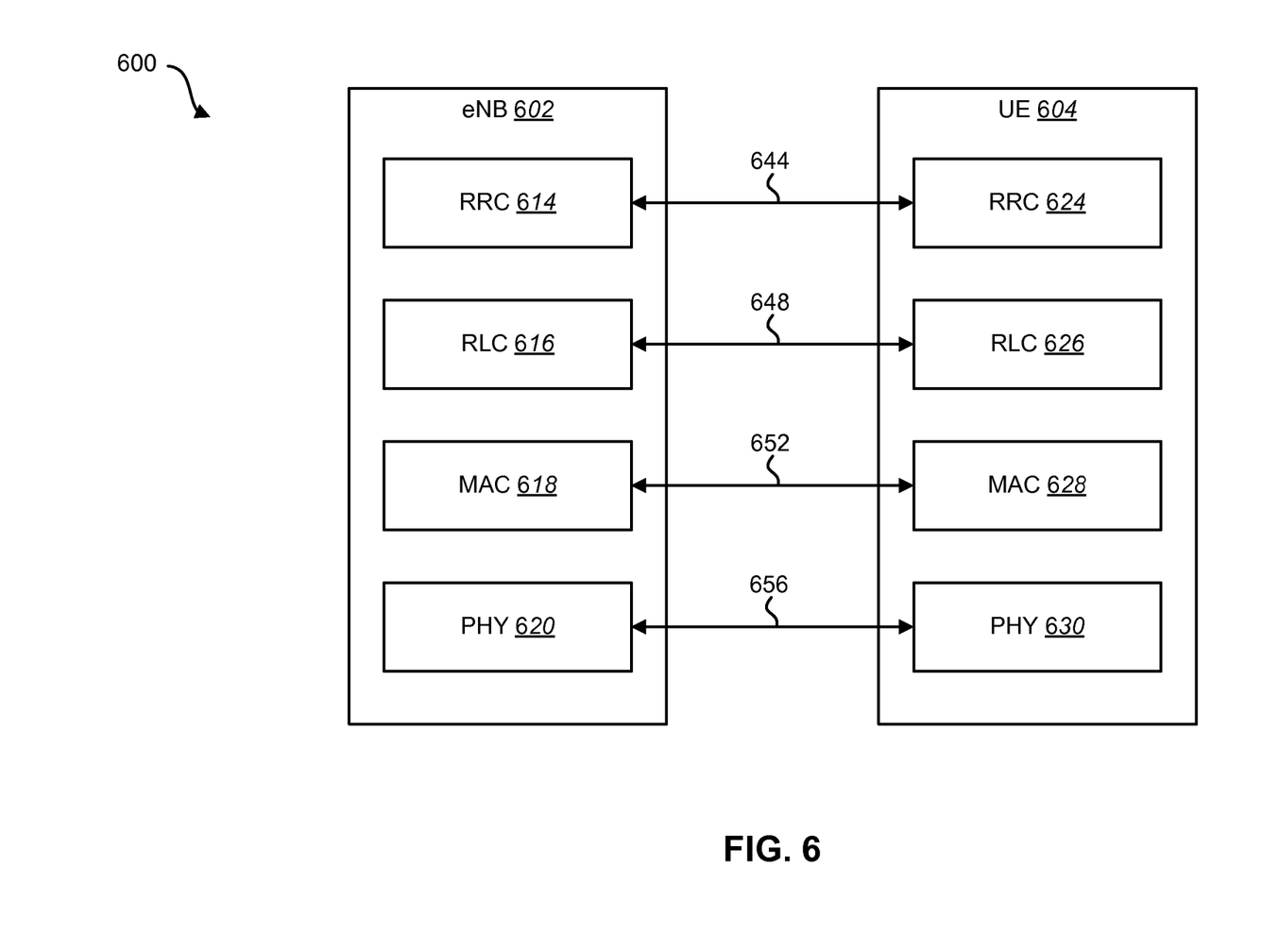
FIG. 6 is a block diagram of a portion of the control protocol stacks for a UE and an eNB.

FIG. 6 is a block diagram 600 of a portion of the control protocol stacks for a UE 604 and an eNB 602. The exemplary protocol stacks provide radio interface architecture between the eNB 602 and the UE 604. In one configuration, the control plane includes a Layer 1 stack that includes a physical (PHY) layer 620, 630, a Layer 2 stack that includes a medium access control (MAC) layer 618, 628 and a Radio Link Control (RLC) layer 616, 626, and a Layer 3 stack that includes a Radio Resource Control (RRC) layer 614, 624.

The RRC layer 614, 624 is generally a Layer 3 radio interface adapted to provide an information transfer service to the non-access stratum. The RRC layer 614, 624 of the present systems and methods may transfer CQI information from the UE 604 to the eNB 602. The RRC layer 614, 624 may also provide RRC connection management.

The RLC layer 616, 626 is a Layer 2 radio interface adapted to provide transparent, unacknowledged, and acknowledged data transfer service. The MAC layer 618, 628 is a radio interface layer providing unacknowledged data transfer service on the logical channels and access to transport channels. The MAC layer 618, 628 may be adapted to provide mappings between logical channels and transport channels.

The PHY layer 620, 630 generally provides information transfer services to the MAC layer 618, 628 and other higher layers 616, 614, 626, 624. Typically the PHY layer 620, 630 transport services are described by their manner of transport. Furthermore, the PHY layer 620, 630 may be adapted to provide multiple control channels. In one example, the UE 604 is adapted to monitor this set of control channels. Furthermore, as shown, each layer communicates with its compatible layer 644, 648, 652, 656.

Figure 7:
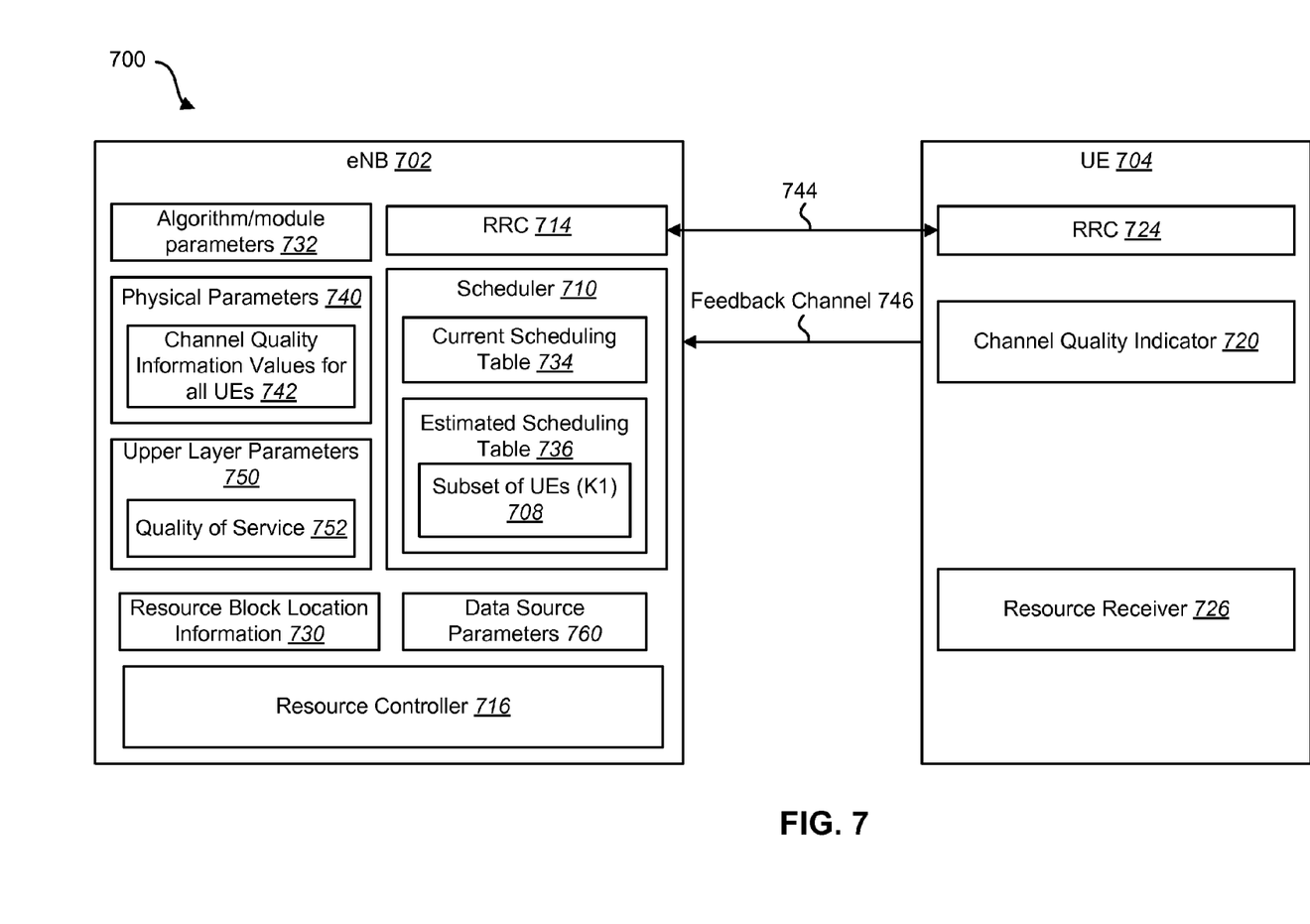
FIG. 7 is a block diagram illustrating one configuration of the eNB and the UE.

FIG. 7 is a block diagram 700 illustrating one configuration of the eNB 702 and the UE 704. The eNB 702 may include a resource controller 716 that allocates resources to the UE 704. The UE 704 may utilize these resources to send information to and receive information from the eNB 702. In one configuration, the resource controller 716 allocates resources for a Physical Downlink Shared Channel (PDSCH) and a Physical Uplink Shared Channel (PUSCH). In addition, the resource controller 716 may allocate resources for a Physical Hybrid Automatic Request Indicator Channel (PHICH). Further, the controller 746 may also allocate resources for a Physical Uplink Control Channel (PUCCH). The PUCCH may be utilized to carry CQI information 720 from the UE 704 to the eNB 702 on an uplink.

The eNB 702 may also include a scheduler 710 that schedules information received from the UE 704 into one or more subframes of the LTE radio frames. In one configuration, the scheduler 710 may allocate different subframes for CQI information 720 received from the UE 704.

In one configuration of the scheduler, it may be assumed that there are N parallel channels available for communication in the system. Further, it may be assumed that there are K users in the system. In one configuration the channel matrix may be denoted by $H(t)=[h_{nk}(t)]$, with entries $h_{nk}(t)$, where $h_{nk}(t)$ is the $n^{th}$ communication channel between the base station and the $k^{th}$ user at time t. Note that $1 \leq n \leq N$ and $1 \leq k \leq K$. In one configuration the matrix of layer 2 and higher layers' parameters used in the scheduler may be denoted by Q(t), with entries [$q_k(t)$], where $q_k(t)$ is the vector of higher layer parameters for user k.

Below is one example of the scheduling algorithm that may be used by the scheduler 714. The scheduler 714 may be a function, f(X,Y), which takes in H(t) and Q(t) as its input arguments, and generates S(t)=F{H(t),Q(t)} which is the scheduling vector with entries $s_n(t)$=k. The scheduling vector may assign to each RB, with RB index n, one of the available users, with user index k. Note that depending on the scheduler 710, one user may be assigned to more than one RB. Hence, from the scheduler's point of view there may be no correlation between number of users and the number of RBs.

The users may then be informed about the scheduling table, S(t), and at time t, the scheduled users in S(t) may receive data on the corresponding RB. The base station may update the higher layer matrix to generate Q(t+1), and then wait for receiving H(t+1) through the feedback channel to generate S(t+1). As it is mentioned above, H( ) contains the channel conditions of all users on all channels.

The following illustrates one method in which an algorithm of the present systems and methods may be added to an existing system. Due to the inherent temporal correlation in the channels, by observing (m+1) samples of channel {H(t−m), H(t−m+1), . . . , H(t−1), H(t)}, the base station may be capable of making an estimation of the channel matrix at time t+1, which may be denoted by $\tilde{H}(t+1)$. The base station may be capable of making an estimation of the higher layer parameters at time t+1, which may be denoted by $\tilde{Q}(t+1)$. Note that this estimate is calculated at time t at the base station. Hence, at time t, both $\tilde{Q}(t+1)$ and $\tilde{H}(t+1)$ are available at the base station. The parameter m indicates the "number" of samples/observations in time. For example at time t and m=2, the method uses m+1=3 three observations of channel {H(t−2), H(t−1), H(t)} to estimate the channel at time (t+1),H(t+1).

Therefore, the base station may make an estimate of the users that are more likely to be scheduled at t+1 by computing $\tilde{S}(t+1)=f\{\tilde{H}(t+1),\tilde{Q}(t+1)\}$. Thus, at time t, the base station can request those users in $\tilde{S}(t+1)$ to provide channel information, and those users that are less likely to be scheduled need not use the feedback channel. This may result in a significant savings in the amount of feedback overhead.

In one configuration, the eNB 702 may request finer and more accurate channel information from the UEs 704 that are more likely to be scheduled. Likewise, the eNB 702 may request that the UEs 704 that are less likely to be scheduled only provide coarse channel information.

In one configuration, the eNB 702 may also include resource block location information 730. In one example, the resource block location information 730 indicates the location of an RB where, in the frequency domain, the UE 704 should receive and decode a downlink data transmission sent from the eNB 702. The location information 730 may be transmitted to the UE 704.

In one configuration, the eNB 702 may include stored parameters that relate to the wireless communication system. For example, the eNB 702 may include algorithm/module parameters 732, data source parameters 760 such as source distribution or rate of data generation at the source, physical parameters 740 such as CQI values for the UEs 742, upper layer parameters 750 such as the Quality of Service 752, etc. The eNB 702 may include a scheduler 710 which may use these parameters to create a current scheduling table 734 and an estimated scheduling table 736. The estimated scheduling table 736 may include references to a subset K1 708 of UEs 704.

The eNB 702 may also include additional sets of parameters such as priority of users and flows, each user's total usage of the system, and its traffic pattern and load. These parameters may be used to create user flow differentiation, provide each class of users with an appropriate share of the total resources, and implement different notions of fairness. Another set of parameters, such as antenna capabilities and physical channel condition of users may be used to maximize the utility of the network.

The above mentioned parameters may be divided into three non-overlapping categories: 1) parameters that are related to the data source, such as traffic pattern and load, 2) parameters related to physical properties of the system and are out of the reach and control of the system and cannot be shaped, such as a physical channel, and 3) parameters that characterize the algorithms and modules of the system such as fairness index and queue/buffer length.

There may be three types of correlation among the parameters in the system. First, there may be a correlation in the source, which may be induced by the continuity in most of the natural sources. This may be reduced as much as possible by the source coder. Second, there may be a correlation in channel, which may be used in the present systems and methods. Third, there may be a correlation created by the algorithms and methods in the system such as a scheduler which creates a dependency of the present decision based on the past experiences. This existing dependency may be exploited.

The present systems and methods may make use of the dependency of parameters to the past and their correlation to the future to judicially select a subset of UEs to access the feedback channel for reporting CQI values. The inherent redundancy and the correlation in channel realizations over time may be used by the present systems and methods. Utilizing the history and memory in the parameters and their temporal correlation has been largely ignored in many systems. The present systems and methods may be added to any existing system without causing degradation in performance.

Temporal correlation enables predictions. By observing a sequence of correlated samples x1, x2, x3, . . . , xn, one can make an estimate of the value of xn+1. The scheduler may use several parameters, (those of the physical layer which mostly relate to channel quality (CQI), and those of higher layers which include but are not limited to Quality of Service, queue length, priority etc) as inputs and generate a scheduling table as output. The physical layer parameter is related to the channel. By use of the correlation among channel realizations, at any given time, the scheduler may estimate the channel quality at the next time instance. Similarly, the higher layer parameters are temporally correlated, because of the temporal correlation in the source that generates the data (for example the data generated by internet browsing or multimedia), and hence, at any given time the scheduler may estimate the value of higher layer parameters at the next time instance. That is, at any given time, the scheduler may estimate its input parameters at the next time instance, hence it can generate its output at the next time instance (users to be scheduled) using the estimated input. These to-be-scheduled-users form the subset K1. There are known methods and algorithms for estimating xn+1, using x1 . . . xn observations.

The UE 704 may include a resource receiver 726 that receives the allocation of resources from the eNB 702. The receiver 726 may also determine the format type of the PUCCH. The UE 704 may include CQI information 720. The UE 704 may transmit CQI information 720 on the PUCCH. The UE 704 may include an RRC layer 724 and may communicate with the eNB 702 through RRC signaling 744 with the corresponding RRC layer 714 of the eNB 702.

Figure 8:
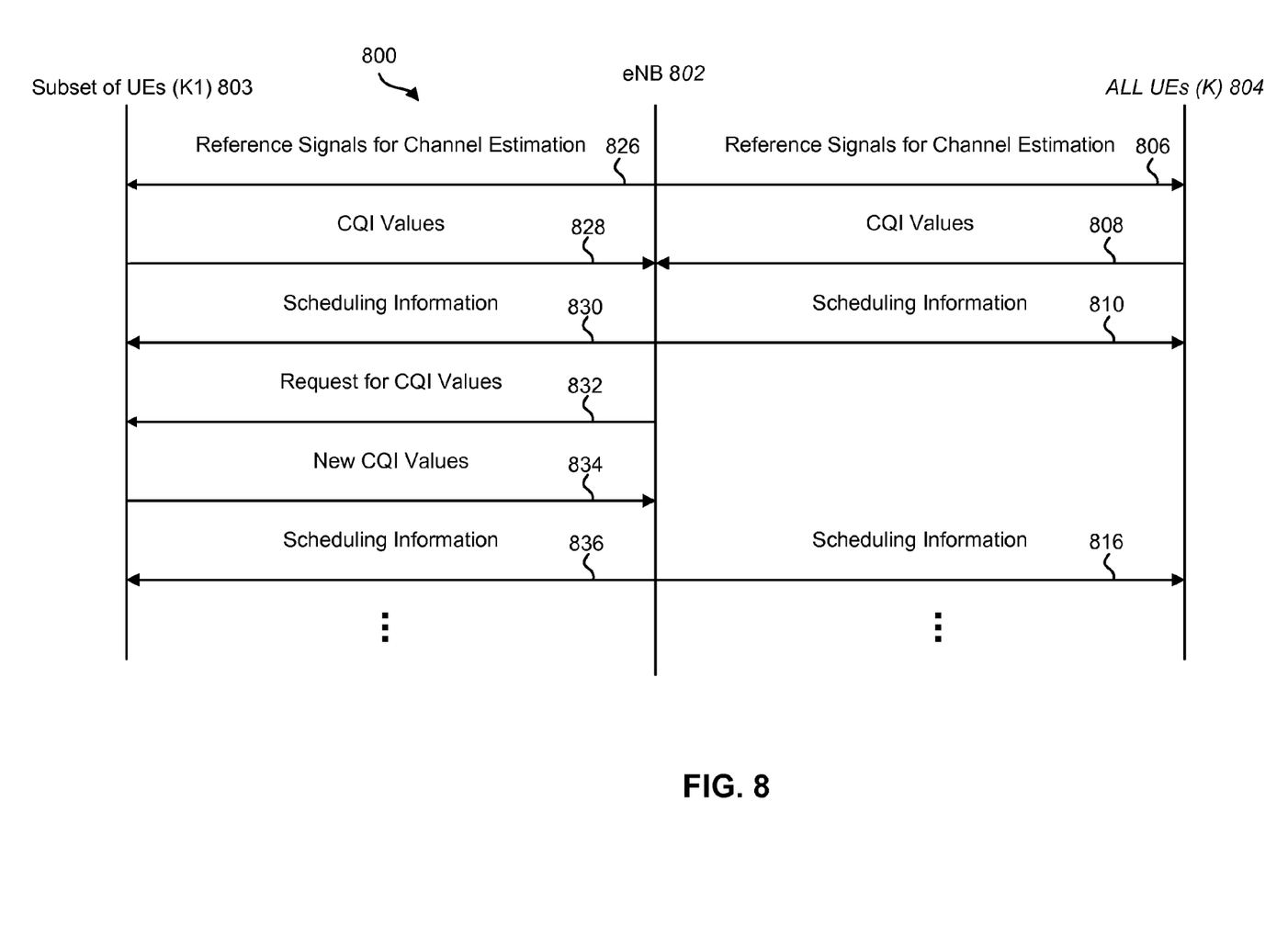
FIG. 8 is a thread diagram illustrating one configuration of using channel characteristics to select a subset of users to access the feedback channel in accordance with the present systems and methods.

FIG. 8 is a thread diagram 800 illustrating one configuration of using channel characteristics to select a subset of users to access the feedback channel in accordance with the present systems and methods. In one configuration, the eNB 802 may transmit 806, 826 reference signals for channel estimation to all the UEs 804 in electronic communication with the eNB 802 including those in the subset K1 803 of UEs. The subset K1 803 of UEs may already be defined. Alternatively, the subset K1 803 of UEs may not yet be defined. All of the UEs 804 including the subset K1 803 of UEs may generate CQI values and transmit 808, 828 these values to the eNB 802 via the feedback channel.

The eNB 802 may then generate scheduling information. The scheduling information may be transmitted 810, 830 to all the UEs 804 including the subset K1 803 of UEs. Alternatively, the scheduling information may only be transmitted 830 to the subset K1 803 of UEs. Alternatively still, the scheduling information may only be transmitted to one or more UEs not part of the subset K1 803 of UEs. The scheduling information may include estimations of the UEs that the eNB 802 predicts will be scheduled in the future. The scheduling information may include only data transmitted to UEs that are scheduled.

The eNB 802 may then transmit 832 a request for CQI values. In one configuration, the eNB may only transmit 832 this request to the subset K1 803 of UEs. The UEs 803 that receive this request for CQI values may then generate new CQI values. The UEs 803 that have generated new CQI values may then transmit 834 the new CQI values to the eNB 802. The eNB 802 may receive the new CQI values. The eNB 802 may then generate new scheduling information and may transmit 816, 836 the new scheduling information to the UEs 804 and the subset K1 803 of UEs. The process may then repeat.

The present systems and methods described herein relate to 3GPP LTE systems. However, the present systems and methods may be utilized for other communication systems such as IEEE 802.16 (e, m), WiMax systems, and other systems where the scheduling of users is applicable.

Figure 9:
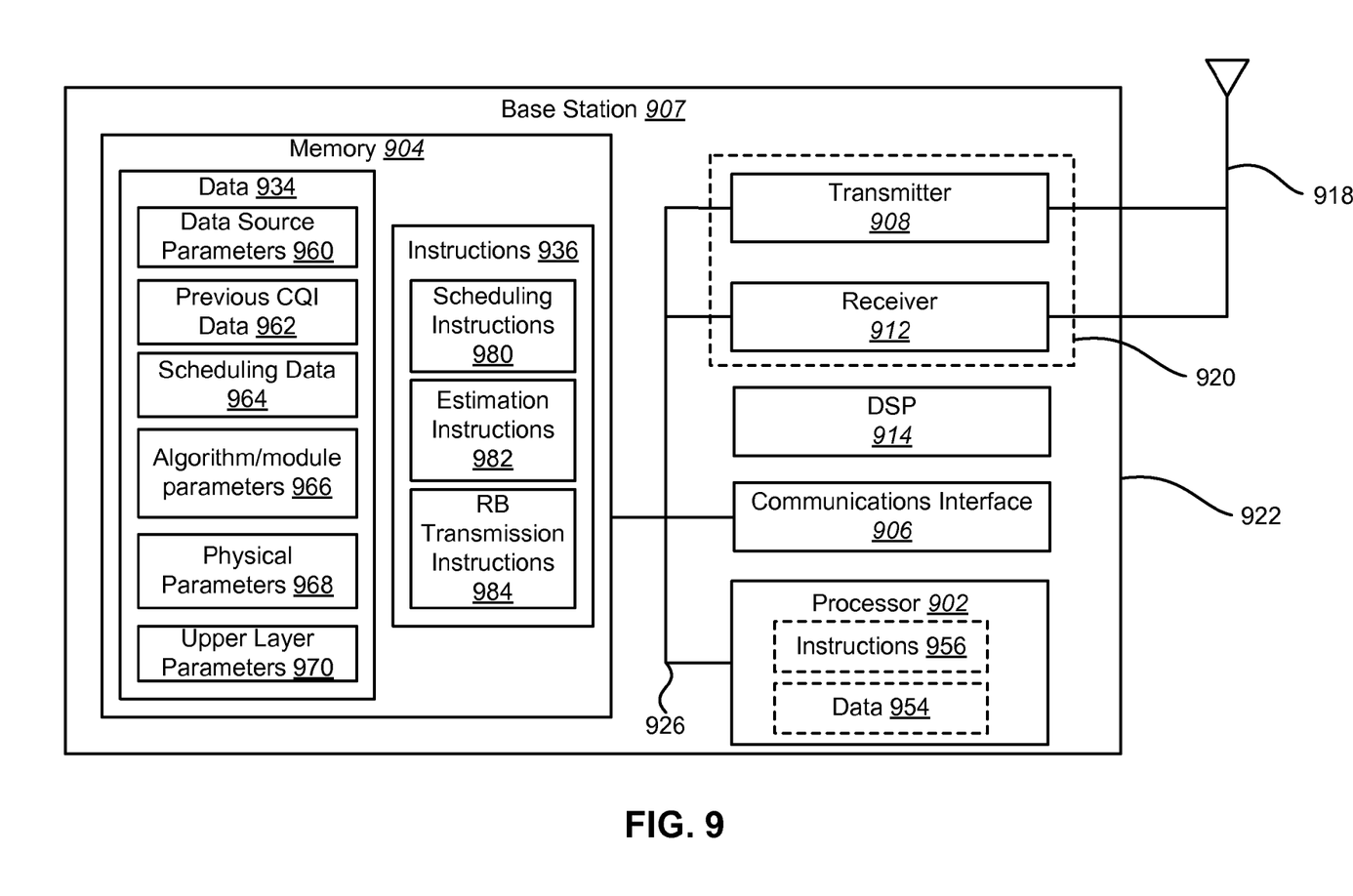
FIG. 9 is a block diagram of a base station in accordance with one configuration of the described systems and methods.

FIG. 9 is a block diagram of a base station 907 in accordance with one configuration of the described systems and methods. The base station 907 may be an eNB, a base station controller, a base station transceiver, etc. The base station 907 may include a transceiver 920 that includes a transmitter 910 and a receiver 912. The transceiver 920 may be coupled to an antenna 918. The base station 907 may further include a digital signal processor (DSP) 914, a general purpose processor 902, memory 904, and a communications interface 906. The various components of the base station 907 may be included within a housing 922.

The processor 902 may control operation of the base station 907. The processor 902 may also be referred to as a CPU. The memory 904, which may include both read-only memory (ROM) and random access memory (RAM), provides instructions and data to the processor 902. A portion of the memory 904 may also include non-volatile random access memory (NVRAM). The memory 904 may include any electronic component capable of storing electronic information, and may be embodied as ROM, RAM, magnetic disk storage media, optical storage media, flash memory, on-board memory included with the processor 902, EPROM memory, EEPROM memory, registers, a hard disk, a removable disk, a CD-ROM, etc.

The memory 904 may store program instructions 936 and other types of data 934. For example, the memory 904 may store program instructions 936 such as scheduling instructions 980, estimation instructions 982 and RB transmission instructions 984. The scheduling instructions 980 correspond to the scheduler 710 and scheduling as described herein. The estimation instructions 982 correspond to the estimating described herein. The RB transmission instructions 984 correspond to RB related communications as described herein. The memory 904 may store other types of data 934 such as data source parameters 960, previous CQI data 962, scheduling data 964, algorithm/module parameters 966, physical parameters 968, and upper layer parameters 970, as described herein. The program instructions 956 may be executed by the processor 902 to implement some or all of the methods disclosed herein. The processor 902 may also use the data 954 stored in the memory 904 to implement some or all of the methods disclosed herein. As a result, instructions 956 and data 954 may be loaded and/or otherwise used by the processor 902.

In accordance with the disclosed systems and methods, the antenna 918 may receive reverse link signals that have been transmitted from a nearby communications device, such as a UE. The antenna 918 provides these received signals to the transceiver 920 which filters and amplifies the signals. The signals are provided from the transceiver 920 to the DSP 914 and to the general purpose processor 902 for demodulation, decoding, further filtering, etc.

The various components of the base station 907 are coupled together by a bus system 926 which may include a power bus, a control signal bus, and a status signal bus in addition to a data bus. However, for the sake of clarity, the various busses are illustrated in FIG. 9 as the bus system 926.

Figure 10:
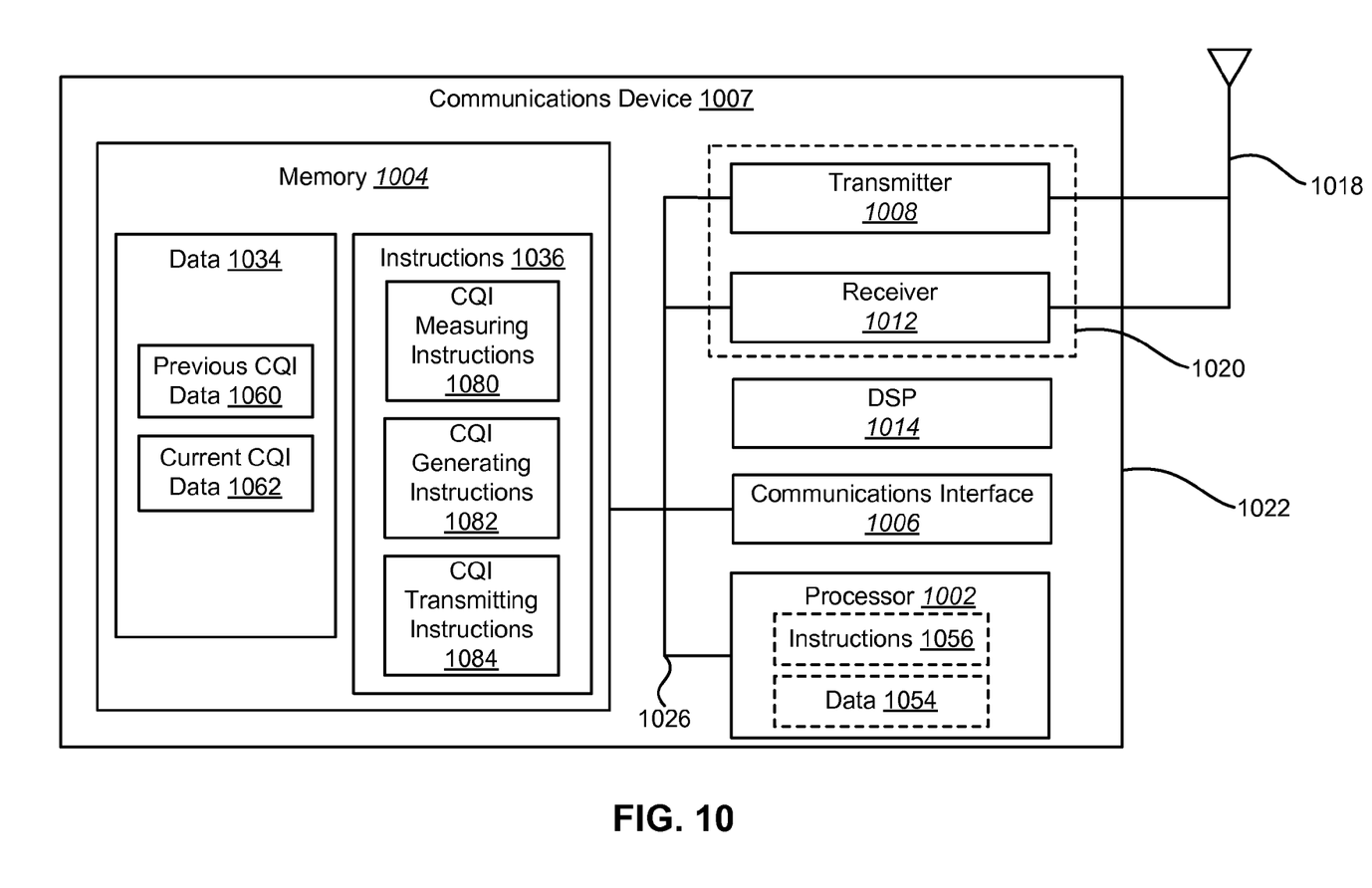
FIG. 10 illustrates various components that may be utilized in a communications device, such as a UE, in accordance with one configuration.

FIG. 10 illustrates various components that may be utilized in a communications device 1007, such as a UE, in accordance with one configuration. The device 1007 includes a processor 1002 which controls operation of the device 1007. The processor 1002 may also be referred to as a CPU.

Memory 1004, which may include both read-only memory (ROM) and random access memory (RAM), provides instructions 1056 and data 1054 to the processor 1002. A portion of the memory 1004 may also include non-volatile random access memory (NVRAM). The memory 1004 may include any electronic component capable of storing electronic information, and may be embodied as ROM, RAM, magnetic disk storage media, optical storage media, flash memory, on-board memory included with the processor 1002, EPROM memory, EEPROM memory, registers, a hard disk, a removable disk, a CD-ROM, etc.

The memory 1004 may store program instructions 1036 and other types of data 1034. For example, the memory 1004 may store program instructions 1036 such as CQI measuring instructions 1080 for measuring the CQI, CQI generating instructions 1082 for generating the CQI, and CQI transmitting instructions 1084 for transmitting the CQI. The memory 1004 may store other types of data 1034 such as previous CQI data 1060 and current CQI data 1062.

The device 1007 may also include a housing 1022 that includes a transmitter 1008 and a receiver 1012 to allow transmission and reception of data between the communications device 1007 and a remote location. The transmitter 1008 and receiver 1014 may be combined into a transceiver 1020. An antenna 1018 may be attached to the housing 1022 and electrically coupled to the transceiver 1020.

The various components of the device 1007 may be coupled together by a bus system 1026 which may include a power bus, a control signal bus, and a status signal bus in addition to a data bus. However, for the sake of clarity, the various busses are illustrated in FIG. 10 as the bus system 1026. The device 1007 may also include a digital signal processor (DSP) 1014 for use in processing signals.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing feedback overhead in a wireless communications system by a base station, the method comprising:
   receiving a first set of channel quality indicator (CQI) values corresponding to a measured channel quality from a first group of one or more mobile communications devices;
   generating scheduling information corresponding to a first time for a second group of one or more mobile communications devices, wherein the second group is a subset of the first group;
   selecting a third group of one or more mobile communications devices that are estimated to be scheduled at a second time, wherein the third group is a subset of the first group, and wherein the second time is after the first time; and
   requesting a second set of CQI values from the third group.

2. The method of claim 1, further comprising generating a scheduling table that comprises the mobile communications devices of the third group.

3. The method of claim 2, further comprising placing all of the mobile communications devices into a set K.

4. The method of claim 3, further comprising placing the mobile communications devices of the third group into a subset K1, wherein K1 is less than K.

5. The method of claim 1, wherein requesting a second set of CQI values from the third group comprises requesting more accurate channel information.

6. The method of claim 5, further comprising requesting coarse channel information from the mobile communications devices that are not part of the third group.

7. The method of claim 1, wherein selecting a third group of one or more mobile communication devices that are estimated to be scheduled at a second time comprises using a temporal correlation of one or more parameters to place certain mobile communications devices into a subset K1.

8. The method of claim 1, wherein selecting a third group of one or more mobile communication devices that are estimated to be scheduled at a second time comprises using a channel property by a scheduler to place certain mobile communications devices into a subset K1.

9. The method of claim 8, wherein the scheduler estimates a future channel matrix.

10. The method of claim 9, wherein the scheduler further estimates higher layer parameters.

11. The method of claim 1, wherein the second set of CQI values from the third group are received over a feedback channel.

12. The method of claim 11, wherein only CQI values from the third group are received over the feedback channel.

13. A base station configured to allocate resources to a communications device, the base station comprising:
  a receiver configured to receive a first set of channel quality indicator (CQI) values corresponding to a measured channel quality from a first group of one or more mobile communications devices;
  a scheduler configured to:
    generate scheduling information corresponding to a first time for a second group of one or more mobile communications devices, wherein the second group is a subset of the first group; and
    select a third group of one or more mobile communications devices that are estimated to be scheduled at a second time, wherein the third group is a subset of the first group, and wherein the second time is after the first time; and
  a transmitter configured to request a second set of CQI values from the third group.

14. The base station of claim 13, wherein the scheduler comprises a set K of all the mobile communications devices.

15. The base station of claim 14, wherein the scheduler comprises an estimated scheduling table.

16. The method of claim 1, wherein the third group is selected based upon at least one of Quality of Service, algorithm/module parameters, physical parameters and data source parameters.

17. The method of claim 1, wherein only CQI values from the third group are received over the feedback channel at a third time, wherein the third time is after the first time but before the second time.

18. The method of claim 1, wherein the second time corresponds to a scheduling of a subframe immediately subsequent to a subframe corresponding to the first time.

19. The method of claim 1, wherein the third group of one or more mobile communications devices that are estimated to be scheduled at a second time are selected based on a dependency of parameters to the past and their correlation to the future.

20. The method of claim 1, further comprising:
  receiving the second set of CQI values from the third group; and
  generating scheduling information corresponding to the second time for a fourth group of one or more mobile communications devices, wherein the fourth group is a subset of the first group.

21. The base station of claim 13, wherein the transmitter is further configured to only request the second set of CQI values from the third group for the second time.

22. The base station of claim 13, wherein the second set of CQI values comprises more accurate channel information than the first set of CQI values.

23. The base station of claim 13, wherein the transmitter is further configured to request a third set of CQI values comprising coarse channel information from mobile communications devices that are not part of the third group.

24. A non-transitory computer-readable medium comprising executable instructions for:
  receiving a first set of channel quality indicator (CQI) values corresponding to a measured channel quality from a first group of one or more mobile communications devices;
  generating scheduling information corresponding to a first time for a second group of one or more mobile communications devices, wherein the second group is a subset of the first group;
  selecting a third group of mobile communications devices that are estimated to be scheduled at a second time, wherein the third group is a subset of the first group, and wherein the second time is after the first time; and
  requesting a second set of CQI values from the third group.

25. The non-transitory computer-readable medium of claim 24, wherein the instructions are further executable for generating a scheduling table that comprises the mobile communications devices of the third group.

26. The non-transitory computer-readable medium of claim 24, wherein the instructions are further executable for placing all of the mobile communications devices into a set K.

27. The non-transitory computer-readable medium of claim 26, wherein the instructions are further executable for placing the mobile communications devices of the third group into a subset K1, wherein K1 is less than K.

28. The non-transitory computer-readable medium of claim 24, wherein the instructions executable for requesting a second set of CQI values from the third group comprise instructions executable for requesting more accurate channel information from the third group comprise.

29. The non-transitory computer-readable medium of claim 28, wherein the instructions are further executable for requesting coarse channel information from the mobile communications devices that are not part of the third group.

30. A base station configured to allocate resources to a communications device, the base station comprising:
  means for receiving a first set of channel quality indicator (CQI) values corresponding to a measured channel quality from a first group of one or more mobile communications devices;
  means for generating scheduling information corresponding to a first time for a second group of one or more mobile communications devices, wherein the second group is a subset of the first group;
  means for selecting a third group of one or more mobile communications devices that are estimated to be scheduled at a second time, wherein the third group is a subset of the first group, and wherein the second time is after the first time; and
  means for requesting a second set of CQI values from the third group.

* * * * *